Nov. 29, 1966  J. W. HYLAND, JR  3,288,343
SHIPPING CARTONS FOR FRANGIBLE ARTICLES AND METHOD FOR USE
Filed July 30, 1964
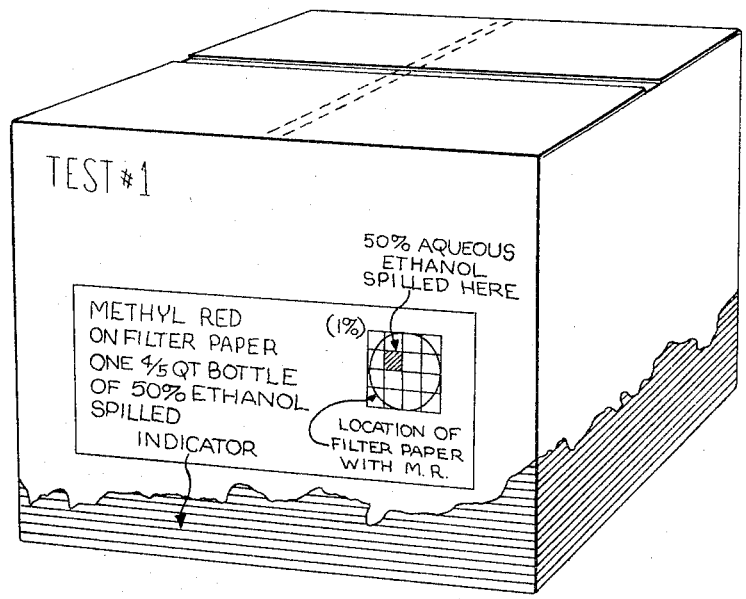
TRACED FROM ACTUAL COLOR PHOTOGRAPH
OF A STAINED SHIPPING CARTON
*INVENTOR.*
JAMES W. HYLAND, JR.
BY
ATTORNEYS 3,288,343
SHIPPING CARTONS FOR FRANGIBLE ARTICLES
AND METHOD FOR USE
James W. Hyland, Jr., Maumee, Ohio, assignor to Owens-Illinois, Inc., a corporation of Ohio
Filed July 30, 1964, Ser. No. 386,343
11 Claims. (Cl. 229—6)

This invention relates to detectors for aqueous alcohol solutions, and to a method for use with frangible containers in which aqueous alcohol solutions are packaged.

The problem

Each year, hundreds of thousands of dollars worth of claims are not collected when glass containers carrying aqueous alcoholic solutions are broken in transit between manufacturer and ultimate consignee. The problem of claims against the shipper is compounded by the fact that when breakage occurs, the lost solution evaporates and dries quite rapidly and produces no visible stain. The shipment thus appears perfectly good when it reaches the consignee. There is no visible proof that there has been breakage, particularly if, say, only one out of about twenty-four pint bottles contained in a carton has been broken.

Accordingly, a substantial advance to the art would be provided by a shipping carton that would produce a readily visible color signal on exposure to aqueous alcoholic solutions and therefore would be easy to observe. This would allow the consignee to make appropriate claims for damages before the carton containing the damaged goods was opened.

It is accordingly an important object of the present invention to provide an improved shipping carton including a colorant that is selectively activatable by aqueous alcoholic solution contact.

A further object is to provide an improved shipping system for aqueous alcohol solutions that produces a visible color signal, indicating goods damaged or broken in shipment.

A further object is to provide a method for treating shipping cartons to render them selectively sensitive to aqueous alcoholic solutions, as distinguished from water, for disclosing in transit damage to the contents.

A still further object is to provide a shipping carton that will change color distinctively when a contained bottle of aqueous alcohol is broken therein.

A still further object is to provide a breakage indicating detector for use with shipping cartons made of liquid permeable sheet materials, such as cardboard.

Other objects of the invention will appear in the following description and appended claims, reference being had to the accompanying drawing, forming a part of the specification.

The single figure of the drawing represents a shipping carton that has been treated in accordance with the invention and colored as the result of the breakage of a bottle of aqueous alcohol therein.

An introduction to the invention

Broadly, the present invention relates to a colorant of selective sensitivity to aqueous alcohol solutions, as distinguished from water alone. In accordance with the invention, a distinct, visible color is produced on the exterior of a shipping carton when aqueous alcohol comes into contact with an indicator of invention that has been appropriately placed within the carton. However, no color signal is produced by the mere contact of water alone with the indicator. Thus, the present invention provides a positive indication of broken goods, and will not give a false signal when a carton containing the improvement of the present invention is inadvertently exposed to weather conditions, such as wetting by rain water.

The present invention is adapted to use in shipping cartons for aqueous alcoholic materials such as medicines, beverages, and the like.

In accordance with the principles of the invention an indicator or colorant of selective sensitivity is so placed within a shipping carton that when a contained bottle of aqueous alcoholic material is broken as by undue impact in shipment, the spilled aqueous alcoholic solution will come in contact with the indicator. Since the indicator is soluble in the aqueous alcohol solution, it will be picked up and dissolved and carried through the walls of the carton to be deposited as a visible color on the outside.

The invention

In the following description, the family of chemical compounds specific to this invention; and the various ramifications of application will be explored in detail.

The family of colorants of selected sensitivity to aqueous alcoholic solutions The members of the family of compounds contemplated within the scope of the invention are all characterized by the same chemcal nucleus, namely an azobenzene group. Structurally, this nucleus is as follows:

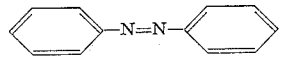

More specifically, the class of compounds encompassed within the scope of invention, is defined by the following general structural formula:

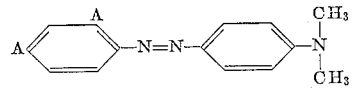

wherein A is selected from H and COOH.

In accordance with the present invention, the following specific compounds have been proven operable in simulated use runs, thereby substantiating the basic principles of the invention:

Methyl red (dimethylamino-azobenzene-o-carboxylic acid)

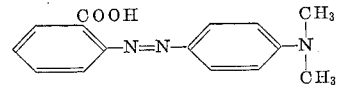

p-Methyl red (dimethylamino-azobenzene-p-carboxylic acid)

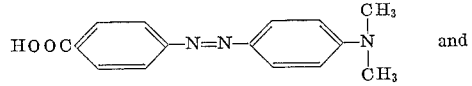

and

Methyl yellow (dimethylamino-azobenzene)

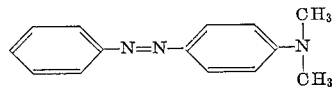

As proof of the present invention, a run simulating field usage was carried out. The following example is based upon the actual run.

EXAMPLE I

Methyl red has been found to produce a very good color indication in accordance with the present invention. This compound is described as p-dimethylamino-azobenzene-o-carboxylic acid. The empirical formula for this compound is $C_{15}H_{15}N_3O_2$. The compound has a molecular weight of 269.29. Analyses indicate carbon 66.90%, hydrogen 5.61%, nitrogen 15.61%, and oxygen 11.88%. The derivative is prepared by the diazotization of anthranilic acid and coupling with dimethylaniline. The structural formula published in the literature for this compound is shown, above.

In utilizing methyl red in accordance with the present invention, the following procedure was employed. This was run #11 of a series. Sheets of Eaton and Dikeman filter paper No. 615, 30 cm. diameter, were dipped in a 1% solution of methyl red in 50% aqueous ethyl alcohol and were dried. An impregnated sheet of filter paper was then placed in the bottom of a shipping carton containing twelve ⅘ quart glass bottles. 800 ml. of 50% aqueous ethyl alcohol was then spilled inside the carton to simulate the breakage of one of the bottles within the carton.

The carton was then left standing until the spilled liquid dried out. The indicator from the impregnated filter paper was taken into solution by the aqueous alcohol. The alcohol penetrated the sides and bottom of the cardboard shipping carton, and produced a substantial yellowish-orange color on the outside. The colored area was about 3–4 inches wide, extending upwardly from the bottom along the sidewalls. The effect of the indication is shown in the drawing.

The drawing was produced by tracing from an actual color photograph of a stained shipping carton. To one side of the shipping carton there was attached a sheet of paper indicating the data of the test. Thus, the methyl red impregnated filter paper was placed on the bottom of the carton, as indicated by the legend "location of filter paper with M.R." The ⅘ quart of 50% aqueous ethyl alcohol was released at the point marked "50% aqueous ethanol spilled here." When the color solution soaked through the sides of the carton, it gave an indication represented by the shaded area "indicator."

*Control tests*

It will be evident to one skilled in the art that an operable indicator must have selective sensitivity to aqueous alcohol as against water alone. Thus, the indicator must shown breakage within the carton, but must not give a false indication as when the carton is accidentally wetted by rain water, which condition might well be encountered on a shipping dock while the carton is in transit between the manufacturer and the consignee.

In accordance wth the invention, the selectively sensitive indicators have been proven to be resistant against effect by water. Therefore, the following example is submitted as proof of this fact, and as substantiating the selective sensitivity of the unique family of compounds comprising the present invention.

EXAMPLE II

A control run, #14 of the series, was prepared in accordance with the procedure of Example I. Thus, a sheet of Eaton and Dikeman filter paper, 30 cm. diameter, was impregnated with a 1% solution of methyl red in 50% aqueous ethanol. The paper was then dried. Thereafter, the impregnated paper was placed in the bottom of a shipping carton containing twelve ⅘ quart bottles.

As the run was intended to simulate field use, a check was made to see if the colorant would penetrate through the walls of the carton when exposed to water per se. Therefore, the carton was placed in one-half inch of water and allowed to stand overnight, 5:00 p.m. to 8:00 a.m.

The bottom part of the carton became wet to about 3–6 inches above the base, outside and inside, but the colorant did not penetrate the walls or bottom. When the carton was dried out, there was no indication of breakage, although the soaking treatment caused some minor distortion of the carton.

From the foregoing, it can therefore be concluded that the tests of Examples I and II clearly show that the breakage of bottles containing aqueous ethanol, produces a deep and easily discernible color on the outside walls of a shipping carton. Further, the tests show that the action of ambient moisture including soaking, would not interfere with a reliable indication.

A color photograph was made to record the results of the test.

EXAMPLE III

It should be noted relative to Example II that the spillage of water instead of 50% aqueous ethanol directly within the carton and over the treated paper caused no leaching out of the colorant from the paper and therefore no coloration of the carton to give a false reading. This run, #13 of the series, was otherwise identical to run #14, constituting Example II.

A color photograph was made to record the results of the test.

EXAMPLE IV

This is run #12 of the series from which the present examples were derived.

This is a further run using methyl red. In this run, a 30 cm. Eaton and Dikeman filter paper No. 615 was impregnated with a 1% solution of methyl red in 50% aqueous ethanol. The so-treated paper was then placed in the bottom of a shipping carton containing forty-eight ½ pint bottles. One ½ pint bottle of 50% aqueous ethanol was then spilled within the carton in a manner to contact the impregnated paper.

A distinct light red color was formed along the bottom of the sidewalls of the carton when the spilled solution dried. This gave a positive indication simulating breakage of a one-half pint bottle of aqueous ethanol within a carton containing forty-eight ½ pint bottles.

A color photograph was made to record the results of the test.

*Logical extension of invention*

The operability of p-methyl red and methyl yellow are predicated upon the fact that they are preferentially soluble in aqueous alcohol and not soluble in water per se.

Therefore, the logical extension of the present invention includes these compounds, as encompassed within the general formula set forth above.

*The unique aspect of the indicators of the present invention*

To show the unique sensitivity of the indicators of the present invention, a number of other chemicals were also checked in a similar manner but were found unsatisfactory. These are as follows:

Aniline Blue (Solvent Blue 3)
Aniline Yellow (Solvent Yellow 1)
Eosin Bluish (Eosin I Bluish)

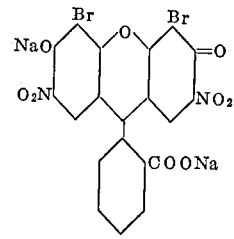

Nigrosin B (Solvent Black 7)
Methylene Blue

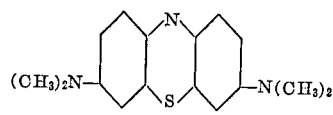

Methylene Blue Chloride

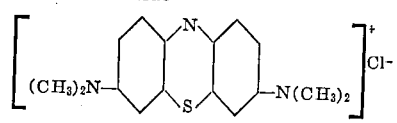

Rhodamine B Base

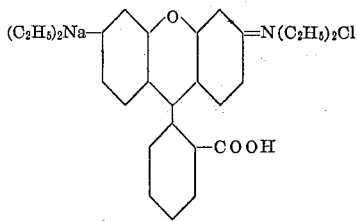

Congo Red: sodium diphenyl diazo-bis alpha naphthylamine sulfonate

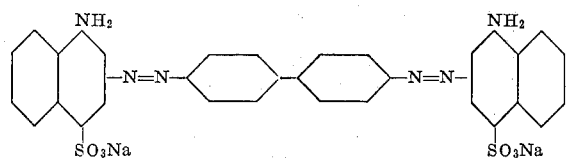

Benzopurpurin B
Benzopurpurin 4B: sodium o-toluidine-diazo bis (naphthylamine-sulfonate)

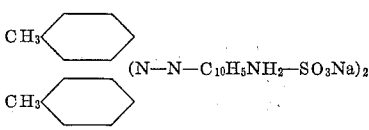

Alizarin Yellow G: p-nitrobenzene azosalicylic acid
Alizarin Yellow R: sodium p-nitrobenzene azo salicylate
Tropeolin O: Resorcine-azobenzene sulfonic acid
Tropeolin OO: Sodium salt of diphenylaminoazo-p-benzene sulfonic acid
Tropeolin G: Sodium salt of diphenylaminoazo-m-benzene sulfonic acid
Ethyl orange: Sodium salt of diethylanilineazobenzenesulfonate
Methyl orange: Sodium salt of p(p-dimethylaminophenylazo) benzene sulfonate
Orange I: Sodium naphthalazo-benzene sulfonate
Propyl red: 2-HOOCC$_6$H$_4$N:NC$_6$H$_4$-4N(CH$_2$CH$_2$CH$_3$)$_2$
Ethyl red:
  C$_2$H$_5$NCH:CHCC$_6$H$_4$:CHC:CHCH:C$_6$H$_4$:NC$_2$H$_5$ The present invention is applicable to use with container wall structures that are pervious to aqueous alcohol so that the colorant can be carried through by capillary action and deposited on the outside. Such a carton may be characterized as being wettable. The common materials are of fibrous board structure, such as cardboard.

Impregnated filter papers have been disclosed. However, it is to be understood that the selectively sensitive colorant can be applied as by coating onto, or impregnating into, the wall of a carton in a condition to be contacted by aqueous alcohol spilled within the carton.

This invention is relatively more sensitive to use with ethanol. However, there is some sensitivity to methanol; and fair sensitivity to isopropanol.

What is claimed is:
1. In a system for shipping frangible containers of aqueous alcohol,
   a carton having a liquid-pervious wall with an inside surface,
   a frangible container containing aqueous alcohol product, positioned within said carton,
   and an alcohol-sensitive colorant within the carton, positioned adjacent to the interior of said wall in exposed condition and in dry form, to be contacted by aqueous alcohol released within the carton by breakage of said frangible container, and said colorant being a compound of the formula

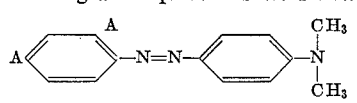

wherein A is selected from H and COOH, said colorant being preferentially soluble in aqueous alcohol product over ambient moisture in order to provide a visible color breakage signal on the outside of the carton indicating loss of the alcohol product resulting from container breakage within the carton.

2. In a carton for shipping frangible containers of aqueous alcohol products,
   a carton having a liquid-previous wall with an inside surface,
   a colorant impregnated onto said inside wall surface to be contacted by aqueous alcohol released within the carton,
   and said colorant being a compound of the formula

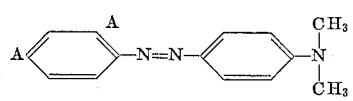

wherein A is selected from H and COOH, said colorant being selectively soluble in aqueous alcohol released within said carton, over ambient moisture, in order to produce a visible color signal on the outside of the carton indicating loss of alcohol product resulting from container breakage within the carton.

3. In a method of producing a visible signal color on the exterior of a shipping carton for bottled aqueous alcohol products,
   the steps of
   providing a carton having a fibrous wall that is pervious to aqueous alcohol, and a floor having an inner surface capable of supporting a frangible container,
   providing a separate porous carrier,
   applying to said carrier a colorant that is preferentially soluble in an aqueous alcohol product over ambient moisture,
   positioning said carrier in exposed dry condition within said carton in a position to be contacted by aqueous alcohol released within said carton,
   releasing aqueous alcohol product within said cation to contact said carrier and dissolve colorant from said carrier and wet said wall to carry said colorant through said wall to the exterior, in order to produce a visible color signal on the exterior of the carton, thereby indicating loss of alcohol product resulting from release of the product within the carton.

4. The invention of claim 3 including applying to said carrier an alcoholic solution of a compound of the formula:

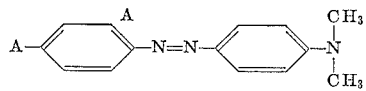

wherein A is selected from H and COOH,
drying said alcoholic solution in said carrier,
and positioning said carrier in contact with the inner surface of said floor of said carton.

5. The invention of claim 3 including applying an alcoholic solution of methyl red onto the inner surface of said floor of said carton, and drying the solution to provide a dry coating of methyl red in a position within the carton to be contacted by aqueous alcohol released within the carton.

6. The invention of claim 3 including applying an alcoholic solution of methyl yellow onto the inner surface of said floor of said carton, and drying the solution to provide a dry coating of methyl yellow in a position within the carton to be contacted by aqueous alcohol released with the carton.

7. In a method of forming a shipping package capable of producing a visible stain-breakage signal when a bottle of aqueous alcohol is broken therein,
   the steps of
   providing a carton having a fibrous wall that is pervious to aqueous alcohol and said wall having a lower portion connected to a floor of pervious material, said floor having an interior surface capable of supporting a frangible container,
providing a separate porous carrier,
applying to said carrier an alcoholic solution of a compound of the formula:

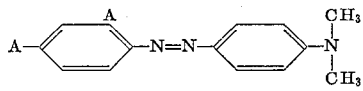

wherein A is selected from H and COOH,
said compound being preferentially soluble in aqueous alcohol over ambient moisture,
drying said alcoholic solution in said carrier,
positioning said carrier in contact with said bottom of said carton,
and then placing a container of aqueous alcohol on said carrier to hold said carrier in contact with said bottom, in a position to be contacted by said aqueous alcohol of said container on fracture thereof.

8. The invention according to claim 7, including applying an alcoholic solution of methyl red onto the interior surface of said floor of said carton, and drying the solution to provide a dry coating of methyl red in the interior of the carton, in a position to be contacted by aqueous alcohol released within the carton.

9. The invention according to claim 7, including applying an alcoholic solution of methyl yellow onto the inner surface of said floor of said carton, and drying the solution to provide a dry coating of methyl yellow in the interior of the carton, in a position to be contacted by aqueous alcohol released within the carton.

10. The invention of claim 1 wherein the alcohol-sensitive colorant is impregnated onto the inside surface of said liquid-pervious wall, and is a compound selected from the group of methyl red and methyl yellow.

11. A shipping carton for bottled aqueous alcohol products, that is capable of producing a visible color signal when a bottle of aqueous alcohol product is broken therein, said carton having a fiber-board wall, a colorant of the formula:

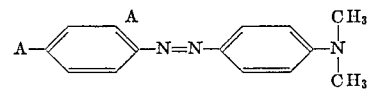

wherein A is selected from H and COOH,
positioned adjacent to the interior of said wall in exposed relation and in dry form, and said compound being selectively soluble in aqueous alcohol and having relatively low solubility in water.

References Cited by the Examiner

UNITED STATES PATENTS

| | | | |
|---|---|---|---|
| 1,245,386 | 11/1917 | Sackett | 229—3.150 |
| 1,773,064 | 8/1930 | Schoettle | 229—3.1 X |
| 1,843,234 | 2/1932 | Karnes et al. | |
| 2,093,985 | 9/1937 | Stansbury. | |
| 2,250,980 | 7/1941 | Workman et al. | |
| 2,470,494 | 5/1949 | Kennison | 206—63.3 |
| 2,682,857 | 7/1954 | Reissmann et al. | 116—114 |
| 2,708,645 | 5/1955 | Norman | 229—3.1 X |
| 2,918,893 | 12/1959 | Norton | 116—114.19 |
| 3,093,242 | 6/1963 | Kuyck et al. | |

GEORGE O. RALSTON, *Primary Examiner.*

LOUIS J. CAPOZI, *Examiner.*